E. E. NOVOTNY.
COMPOSITION MATERIAL.
APPLICATION FILED MAR. 9, 1920.

1,370,666. Patented Mar. 8, 1921.

Inventor
Emil E. Novotny
By his Attorneys
Meyers, Cavanagh & Hyde

UNITED STATES PATENT OFFICE.

EMIL E. NOVOTNY, OF PHILADELPHIA, PENNSYLVANIA, ASSIGNOR TO JOHN STOGDELL STOKES, OF PHILADELPHIA, PENNSYLVANIA.

COMPOSITION MATERIAL.

1,370,666.

Specification of Letters Patent.

Patented Mar. 8, 1921.

Application filed March 9, 1920. Serial No. 364,512.

*To all whom it may concern:*

Be it known that I, EMIL E. NOVOTNY, a citizen of the United States, and resident of Logan, Philadelphia, in the county of Philadelphia and State of Pennsylvania, have invented certain new and useful Improvements in Composition Materials, of which the following is a specification.

This invention relates to a composition material adapted for use in the manufacture of a great variety of articles, such as phonographic records, printing plates, matrices, tubes, bases, insulating panels, gears, gear blanks and other articles.

Before entering into a detailed description of my invention I will briefly state that my composition material embraces a supporting body or base, preferably composed of a fibrous substance, such as news board, chip board, card board, or the like, having incorporated therein, and coated with, an acetic aldehyde condensation product formed by the reaction of a phenol or creosol and an acetic aldehyde ($CH_3$—CHO).

My invention consists in the composition material set forth in and falling within the scope of the appended claims.

Figure 1:
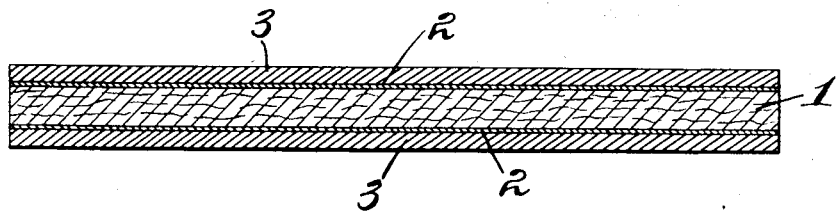
Figure 1, is a cross sectional view of a sheet or blank of my composition material.

Referring now to the accompanying drawings in detail, the numeral 1 indicates the supporting body or base of my composition material, and is preferably composed of an open, fibrous sheet-like material such as card board, although it may be of any substance suitable for the purpose, such as chip board, news board, ply wood, felt, laminated paper, wood fiber, or a blank of one or more laminations of textile material, such as cotton or wool or fiber made therefrom. I prefer to use such fibrous substances because each of those mentioned possesses the characteristic of being compressible under pressure in molding without having any undue spreading or side-flow action.

I preferably impregnate this base 1, with a condensation product formed by the reaction of phenol or creosol and an acetic aldehyde such as an acetaldehyde or its polymer paraldehyde.

In making this condensation product I may for example use approximately one hundred parts of phenol to seventy five parts of acetaldehyde, in conjunction with a mineral acid, such as hydrochloric acid or sulfuric acid of suitable strength, to act as a catalyst while the constituents are undergoing reaction. When the condensation product has been produced, this catalyst should be eliminated or neutralized. Hydrochloric acid may be eliminated for example, by passing live steam through the mass, or both the acids may be neutralized by introducing a sufficient quantity of an alkali. For example, ammonia may be added to counteract or neutralize the acid.

This condensation product when thoroughly dehydrated may be made in the form of a powder, or a varnish when in solution with alcohol, acetone, benzol, or a combination of these. It differs from phenol-formaldehyde condensation products in that it is capable of retaining to a great extent, its thermoplastic properties, and therefore, may be used for cold-molding much as shellac-molding plastics are used. If desired this condensation product can be set to a hard and infusible form by prolonged heating in an oven.

For most purposes it is desirable to secure a quick reaction in preparing the product, and I, therefore, prefer to add to the batch of material a small quantity of a final catalyst such as about two per cent. of nigrosin black, or zinc chlorid, which causes a quick reaction. I may also mix with the condensation product suitable colors, pigments and fillers, if deemed desirable.

I may also make this condensation product by mixing one hundred parts of phenol and thirty five parts of acetaldehyde, causing reaction to an intermediate stage by adding a suitable catalyst, such as an acid, then eliminating the acid, and then adding sodium bisulfite compounded with acetaldehyde to harden the mass. I have found that these acetic aldehyde condensation products penetrate under heat and pressure more readily than the formaldehyde product, thus enabling the production of strong durable blanks or boards.

Of course, at the time of impregnating the base 1 with this acetic aldehyde condensation product, the latter is in a syrupy or liquid form, or in solution. In impregnating the base I do not completely saturate the fibrous material with the condensation product, that is to say, I do not load the cells of the fiber to their full capacity, but I simply impregnate the fiber so that when dried out it will contain but the minimum amount of condensation product consistent with my purpose. I prefer to resort to this minimum impregnation in order that my composition material, when being molded to form an article, will still be capable of compression due to the fact that its cellular construction is not entirely filled with the cement-like condensation product. In preparing the condensation product solution I prefer to use a mixture composed of equal parts of alcohol and benzol, as this enables me to remove all the water contained in the fiber body much more rapidly than if a single solution be used. My condensation solution may be composed of one part of the condensation product mixed with twenty parts of the alcohol-benzol solvent. However, I do not confine myself to these specific proportions for the solution or to the use of alcohol and benzol, or either of these, as other solvents such as acetone may be used. In impregnating the base 1, the fiber sheets constituting the same are placed in a bath of the condensation solution for a sufficient length of time to become impregnated. The fibrous sheets are then drained in tanks, in order to salvage the excess condensation solution dripping therefrom. They are then placed in vacuum ovens, where, at a suitable temperature, for instance, from one hundred to three hundred degrees F., the solvents are removed, together with any moisture in the material, so that the condensation product in the body is set or hardened, either wholly or partially, just as may be desired for the particular work to be done. Upon removing the impregnated fibrous sheets or blanks from the oven, they will be found dry and resistant to moisture and also stiff enough to provide sufficient resistance to compression, as is desirable in the molding operation.

The now impregnated and dried fibrous base 1 is then coated, preferably upon both faces, with a film or layer of the acetic aldehyde condensation product, as indicated at 2. The sheet so coated is replaced in the vacuum oven and heated or cooked for a suitable length of time, say from five to thirty minutes, in order to set the coatings, thereby forming skin-like films. These layers or films 2, however, are not hardened to final infusible form but are still capable of being fashioned under pressure. These layers or films 2 are intended to form barrier layers to prevent the material of the exterior or outer coatings 3 of the blank, hereinafter described, from passing through or penetrating the fibrous body 1. After these layers 2 have been hardened to their skin-like form the blank is removed from the oven and the outer or exterior coatings 3 are preferably applied to both sides thereof and directly upon the layers 2. These exterior coatings 3 are also composed of an acetic aldehyde condensation product, are preferably of a greater thickness than the layers 2 and are of a richer mixture of the condensation product, that is to say, contain a greater percentage of the condensation product in proportion to any pigments or fillers which may be used therein. The blank as thus finally coated is again placed in the vacuum oven and heated for a suitable length of time, say from five to fifteen minutes at a temperature of from 100 to 200 degrees F., until the upper coating assumes a skin-like condition and is partially hardened, so that it is no longer sticky, tacky or capable of flowing freely, but yet is capable of taking molding impressions under pressure against a matrix or the like.

For some purposes, where it is desired to polish the outer faces, the latter, coated as described may be placed between the platens of a warm press for a brief time, say one or two minutes, and pressed so as to give the blank a true flat form and to impart to the surface thereof a smooth polished finish. For this purpose the blank may also be rolled between the cylinders of a cellular heated calendering machine.

The blank as thus finished is now ready for use and may be employed for molding articles of any suitable character.

Figure 2:
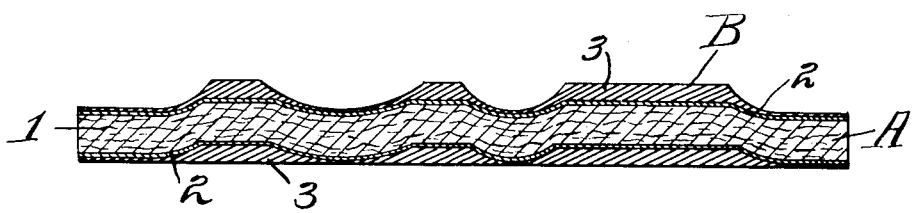
Fig. 2, is a cross sectional view showing a printing plate made from the blank of Fig. 1, Fig. 3, is a cross sectional view of a phonographic record made from the blank of Fig. 1.

For example, in Fig. 2, showing a printing plate made from such a blank wherein the letter A indicates the plate as an entirety and B the impression or printing surface thereof.

Figure 3:
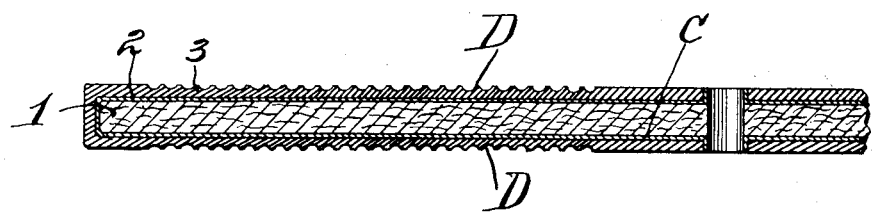

In Fig. 3, the letter C indicates as an entirety a phonographic disk record made from one of my blanks, with the sound producing surface thereof, which in the present instance covers both sides of the blank indicated at D.

Both the printing plates and the phonographic records shown may be made by molding a blank such as shown in Fig. 1, against a suitably prepared matrix under the action of heat and pressure.

I herein merely mention the printing plates or phonographic records, by way of illustration, and make no claim to the same in this case, as these form the subject matter of separate applications, Serial Nos. 366,098 and 366,097, respectively, both filed March 15, 1920, the present case being directed to a blank, material or article from which printing plates, phonographic records, and numerous other articles may be made.

In connection with the preparation of my composition material I wish it to be understood that the fibrous body thereof may be either in the nature of single sheets, or may be composed of a plurality of laminations or sheets united or adhesively united by a suitable cement. For this purpose I may use a cement composed of an acetic aldehyde condensation product itself, or in fact any cementitious material suitable for the purpose, may be employed.

I also wish it to be understood that if desired, the outer coatings 3 may be entirely omitted, and the fibrous body simply provided on one or both faces with a single or homogeneous coating of the acetic aldehyde material, of more or less richness or purity, that is to say, with a greater or less degree of filling material such as wood flour, metallic oxids, pigments, coloring material or the like.

When a blank has been finished it may be stored for future use, and will keep indefinitely in a moldable condition. Furthermore as but relatively little condensation product is employed in the manufacture of my composition material the latter may be produced in great quantities at an exceedingly low cost far below that of the condensation material itself, so that articles may be produced much more economically of my composition material than from a solid body of a condensation product. The use of acetic aldehyde condensation product possesses manifest advantages over the use of phenol and formaldehyde condensation products, because not only is the cost of producing the acetic aldehyde condensation product approximately one third of the cost of the phenol and formaldehyde condensation product, but possessing as it does a much lower shrinkage characteristic, it will, when united with fiber, produce a flatter and more suitable structure, because warping will not result to the same extent as occurs when fiber is impregnated or coated with a formaldehdye condensation product. And furthermore because of its lower shrinkage factor the material, during molding, will not interlock with overhangs or recesses in the matrix, as is likely to occur with a formaldehyde condensation product. The acetic aldehyde condensation product is also much better adapted for use as insulation material because it provides better resistance to the action of electric currents of high frequency.

While I have herein shown and described a preferred embodiment of my invention, I wish it to be understood that I do not limit myself to all the precise details herein set forth by way of illustration, as modification and variation may be made without departing from the spirit of the invention or exceeding the scope of the appended claims.

What I claim is:

1. An article of the class described comprising a body of porous material having an exterior coating layer composed of an acetic aldehyde condensation product.

2. An article of the class described comprising a body of porous material impregnated with an acetic aldehyde condensation product and having an exterior coating layer of said acetic aldehyde condensation product.

3. An article of the class described comprising a body of fibrous material having a plurality of coating layers composed of an acetic aldehyde condensation product.

4. An article of the class described comprising a body of fibrous material having an inner skin-like coating of an acetic aldehyde condensation product applied thereto, and having a second coating, or exterior coating, also of an acetic aldehyde condensation product applied to the first mentioned coating.

5. An article of the class described comprising a body of fibrous material, a barrier coating applied thereto, and a second or exterior coating of an acetic aldehyde condensation product applied to the barrier coating, the material of the exterior coating being prevented penetrating the fiber by the barrier coating.

6. An article of the class described comprising a body of fibrous material impregnated with an acetic aldehyle condensation product, and a plurality of layers or coatings of the same condensation product imposed upon the fibrous body.

7. An article of the class described comprising a relatively hard body of a non-flowing compressible material provided with coatings of an acetic aldehyde condensation product.

8. An article of the class described comprising a body of fibrous material impregnated with a condensation product formed by the reaction of phenol or creosol and acetaldehyde, and a skin-like coating of such condensation product applied to the fibrous body.

9. An article of the class described comprising a porous body treated with a condensation product formed from phenol or creosol, acetaldehyde, and a suitable catalitic agent.

10. An article of the class described composed of a fibrous blank impregnated with a minimum amount of a partially hardened and set acetic aldehyde condensation product, each face of said blank having a skin-like coating of a partially hardened and set acetic aldehyde condensation product applied thereto.

11. An article of the class described including a base impregnated with a cementitious material and having a layer of an acetic aldehyde condensation product.

12. An article of the class described including a base impregnated with a cementitious material composed of an acetic aldehyde condensation product and having a layer of cementitious material imposed thereon.

13. An article of the class described comprising a base coated with a layer of an acetic aldehyde condensation product.

14. An article of the class described comprising a base having two coatings of cementitious material applied thereto, one of said coatings consisting of an acetic aldehyde condensation product.

15. An article of the class described comprising a body of relatively hard non-flowing compressible material impregnated with an acetic aldehyde condensation product and having a suitable face coating imposed thereon.

16. An article of the class described comprising a body of porous material, an acetic aldehyde condensation product associated therewith and a hardening agent for the acetic aldehyde condensation product.

17. An article of the class described comprising a body of porous material, an acetic aldehyde condensation product associated therewith, a catalyst, and a hardening agent for the acetic aldehyde condensation product.

Signed at New York city, in the county of New York and State of New York, this 26th day of February, 1920.

EMIL E. NOVOTNY.